Patented Apr. 10, 1951

2,548,447

UNITED STATES PATENT OFFICE 2,548,447

FLUID COMPOSITIONS CONTAINING GLYCIDYL POLYETHERS

Edward Charles Shokal, Walnut Creek, and Albert C. Mueller, Berkeley, Calif., assignors to Shell Development Company, Emeryville, Calif., a corporation of Delaware No Drawing. Application November 21, 1950, Serial No. 196,948

12 Claims. (Cl. 260—32.4)

This invention relates to a new composition of matter particularly adaptable for use as a coldsetting adhesive.

Glycidyl polethers of polyhydric phenols are obtained by reacting epichlorhydrin with a polyhydric phenol and a base. Upon addition of a hardening agent, these glycidyl ethers cure without heating to resinous materials of excellent physical and adhesive strength. However, such glycidyl ethers are either solids or very viscous liquids at ordinary atmospheric temperatures. When employed for adhesive purposes, it is necessary that the mixture of glycidyl ether and hardening agent be at least spreadably fluid upon being applied to surfaces desired to be united. While the glycidyl ether composition may be heated to spreadable consistency, such procedure is undesirable particularly because the ether is capable of curing at ordinary atmospheric temperatures. The use of volatile solvents to obtain spreadability in the glycidyl ether composition, from which they must evaporate, is not generally practicable since the solvent cannot evaporate to appreciable extent from the composition placed as an adhesive layer between usually impervious surfaces of objects being glued together. Furthermore, the presence of even small proportions of most solvents retained in the cured resin destroys or greatly reduces the strength thereof. It was, therefore, surprising to discover that a particular class of solvents could be used to fluidize the glycidyl ethers while the cured compositions still containing the solvent also possessed the high physical and adhesive strength required for adhesive purposes.

In broad aspect, the composition of the present invention is a spreadably fluid solution of glycidyl ether in admixture with a fluidizing proportion of a normally liquid, cyano-substituted hydrocarbon, of which acetonitrile is a particularly preferred example. In the composition, the glycidyl ether has a 1,2-epoxy equivalency greater than 1.0 so as to be capable of curing to an infusible resinous material. Although the cyanosubstituted hydrocarbon does not appear to be chemically combined to other constituents in the cured resin, the physical strength of the cured resin remains very high. This fact is in distinct contrast to the strength of the cured resin containing other inert fluidizing compounds. In addition to being useful for adhesive purposes, the new composition is well suited as a potting material and as a casting resin in having the necessary fluidity for application while the cured resin therefrom has high strength and resistance to the solvent action of water and organic compounds.

Glycidyl ethers of dihydric phenols employed in the composition are obtained by reacting at about 50° C. to 150° C. one to two or more moles of epichlorhydrin with a mole of dihydric phenol in the presence of a base such as sodium, potassium, calcium or barium hydroxide in amount of about 10% to 30% stoichiometric excess of base to epichlorohydrin—i. e., 1.1 to 1.3 equivalents of base per mole of epichlorhydrin. The reaction is effected in aqueous medium by first mixing together the water, dihydric phenol and the base, which mixture is then heated. The epichlorhydrin is added rapidly as a whole and heating is continued with agitation for several hours to convert the reactants to a taffy-like mass. If desired, the base may be added in portions during the course of the reaction. While hot, the agitated reaction product is washed with water until free of base. Although the product is a complex mixture of glycidyl ethers, the principal product may be represented by the formula:

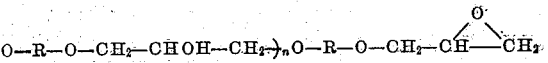

wherein R represents the divalent hydrocarbon radical of the dihydric phenol and $n$ is an integer of the series 0, 1, 2, 3, etc. The length of the chain can be made to vary by changing the molecular proportion of epichlorohydrin to dihydric phenol. Thus, by decreasing the moles of epichlorhydrin per mole of dihydric phenol from about two downwards toward one, the molecular weight and the softening point of the resinous glycidyl ether is increased. In general, these glycidyl ethers, having an epoxy equivalency between 1.0 and 2.0, contain terminal 1,2-epoxy groups and have alternate aliphatic and aromatic nuclei linked together by ethereal oxygen atoms.

Any of the various dihydric phenols is used in preparing the esterifiable polyethers including mononuclear phenols such as resorcinol, catechol, hydroquinone, methyl resorcinol, etc.; or polynuclear phenols like 2,2-bis(4-hydroxyphenyl)propane (bis - phenol), 4,4' - dihydroxybenzophenone, bis(4-hydroxyphenyl)methane, 1,1-bis(4-hydroxyphenyl)ethane, 1,1-bis(4-hydroxyphenyl)isobutane, 2,2-bis(4-hydroxyphenyl)butane, 2,2 - bis(4 - hydroxy-2-methylphenyl)propane, 2,2-bis(4-hydroxy-2-tertiarybutylphenyl)- propane, 2,2 - bis(2-hydroxynaphthyl)pentane, 1,5-dihydroxynaphthalene, etc.

The following example illustrates preparation of a typical glycidyl ether employed in the compositions of the invention, wherein the parts are by weight.

EXAMPLE I

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorhydrin were added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semi-solid with a viscosity above 1000 poises at 25° C., a melting point of 27° C. by Durran's mercury method and an epoxide equivalent weight of 249. The average molecular weight measured ebullioscopically in ethylene dichloride was 483. For convenience, this product will be referred to hereinafter as resin A.

The glycidyl ether of a polyhydric phenol employed in the composition has a 1,2-epoxy equivalency greater than 1.0, and is usually between 1.0 and 2.0. The 1,2-epoxy equivalency is the value obtained upon dividing the average molecular weight of the ether by the epoxide equivalent weight thereof. Thus, the epoxy equivalency of resin A was 1.94.

The epoxide equivalent weight of the glycidyl ethers of polyhydric phenols is determined by heating a one-gram sample of the ether with an excess of pyridinium chloride dissolved in pyridine (made by adding pyridine to 16 cc. of concentrated hydrochloric acid to a total volume of one liter) at the boiling point for 20 minutes whereby the pyridinium chloride hydrochlorinates the epoxy groups to chlorhydrin groups. The excess pyridinium chloride is then back-titrated with 0.1 N sodium hydroxide to the phenolphthalein end point. The epoxide value is calculated by considering one HCl as equivalent to one epoxide group. This method is used for obtaining all the epoxide values discussed herein.

In like manner to that described above for preparation of resin A, other glycidyl polyethers of bis-phenol may be prepared which have different molecular weights depending upon the molar ratio of epichlorhydrin used in preparation thereof. The following table shows the variation in properties with variation in molar ratio:

Table I

| Mol Ratio Epichlorhydrin to Bis-Phenol | Durran's Softening Point | Molecular Weight | Epoxide Equivalent Weight | 1,2-Epoxy Equivalency |
|---|---|---|---|---|
| | °C. | | | |
| 2.6 (Resin A) | 27 | 483 | 249 | 1.94 |
| 1.57 | 77 | 903 | 516 | 1.75 |
| 1.22 | 98 | 1,415 | 886 | 1.60 |

Polyethers of still higher molecular weight are best obtainable by reacting a polyether of lower molecular weight with less than the equivalent amount of dihydric phenol. For example, a resinous polyether having a melting point of about 130° C. and an epoxide equivalent weight of 2130 is obtained by reacting the polyether noted above having a softening point of 98° C. with an added 5% of bis-phenol. This reaction is effected by heating the polyether to 150° C. and then adding the bis-phenol. The heating is continued for about two hours while gradually increasing the temperature to about 200° C. and stirring the reaction mixture.

The glycidyl ethers employed in the compositions have a viscosity of at least 100 poises at 25° C. There is no particular upper limit for the viscosity although ethers having a melting or softening point above 160° C. by Durran's mercury method are rarely used. Thus, the glycidyl ethers have a viscosity of at least 100 poises at 25° C., but the viscosity may be so high that the ethers are solids at this temperature. Best results are obtained with ethers having a Durran's mercury method melting point of from about 10° C. to 50° C. If these are glycidyl ethers of bis-phenol, they have an epoxide equivalent weight of about 190 to 400. In some cases, it may be desirable to use an ether having a melting point as high as 110° C.

The fluidizing diluents employed in the compositions of the invention are cyano-substituted hydrocarbons. They are normally liquid in having a melting point below 10° C. and contain one or more nitrile groups linked to the hydrocarbon radical which may be of any type desired: saturated or unsaturated; aliphatic, alicyclic or aromatic. Although it has been found that acetonitrile or methyl cyanide is a particularly preferred member, examples of other non-limiting compounds include propionitrile, butyronitrile, methyl ethyl acetonitrile, isovaleronitrile, capronitrile, lauronitrile, acrylonitrile, methacrylonitrile, crotonitrile, allyl cyanide, oleonitrile, elaidonitrile, propiolonitrile, glutaronitrile, adiponitrile, suberonitrile, allyl-malononitrile, cyclohexyl cyanide, benzonitrile, o-tolunitrile, and phenylacetonitrile. In general, it is preferred to employ a cyano-substituted saturated hydrocarbon containing one to two cyanide groups, which compound contains 2 to 8 carbon atoms. Good results are obtained with alkyl cyanides containing up to 4 carbon atoms, although higher members of this class containing up to 12 carbon atoms and having melting points below 10° C. may be used, if desired. The invention is not concerned with use of carbylamines containing the group—N≡C; rather, the compositions contain as fluidizing component one or more cyano-substituted hydrocarbons wherein the cyano or nitrile group—C≡N is preferably the sole substituent.

The compositions of the invention contain sufficient of the normally liquid, cyano-substituted hydrocarbon thoroughly mixed with the glycidyl ether of the polyhydric phenol that the composition has at least spreadable fluidity at normal temperatures. The proportion of fluidizing nitrile employed in admixture with the glycidyl ether in the composition is such that the composition, in general, has a viscosity from about 3 to 50 poises at 25° C. The proportion of nitrile needed to achieve the desired viscosity will vary considerably owing primarily to the difference in fluidity among the particular glycidyl ethers. The important feature of the invention is the obtainment of a spreadable or pourable consistency for the composition and not particular numerical limits for the constituents therein. Thus, while use of sufficient nitrile to give a viscosity of about 3 to 50 poises at 25° C. can be employed, it may be desired that the viscosity be within the broader range of from about 1 to 80 poises at 25° C., each extreme of which has spreadable consistency, although at from about 1 to 40 poises it is readily pourable. When used for adhesive purposes, which is the primary object of the invention, it is usually desired that the composition have sufficient body so that it will not run off surfaces too readily. In this case, it is generally preferred that the composition have a viscosity of about 30 to 70 poises at 25° C.

Although the amount of fluidizing nitrile employed in the composition will be defined primarily herein with respect to viscosity of the composition, it may be noted that the viscosities of the nitriles are so low as compared to those of the glycidyl ethers that the compositions contain a minor proportion or less than 50% by weight of nitrile. As low as about an added 2% by weight of nitrile is satisfactory with the glycidyl ethers of lower viscosity. Besides enabling the cured compositions to retain high strength characteristics, the nitriles are very efficient viscosity reducers for the glycidyl ethers. The efficiency with respect to viscosity reduction for acetonitrile, a typical fluidizing diluent of the invention, in comparison with methanol will be evident from the results given below in Table II. Compositions were prepared from resin A in admixture with the noted percentages of each of the two diluents. The viscosities were determined with the aid of Gardner-Holdt tubes.

*Table II*

| Percentage Diluent | Viscosities in Poises at 25° C. With— | |
|---|---|---|
| | Acetonitrile | Methanol |
| 11.5 | 12 | 6.5 |
| 13 | 5.0 | 5.3 |
| 15 | 3.7 | 4.7 |
| 20 | 1.0 | 3.2 |

In using the compositions of the invention, there is added a hardening agent to the fluid composition containing the cyano-substituted hydrocarbon and the resin-forming glycidyl polyether of a polyhydric phenol having a 1,2-epoxy equivalency greater than 1.0. Upon the addition, even at ordinary temperature, the composition begins to cure and become hard. Among suitable hardening agents are amino compounds such as triethylamine, ethylene diamine, diethylamine, diethylenetriamine, triethylene tetramine, 2,4-diamino-2-methylpentane (diacetone diamine), dicyandiamide, melamine, pyridine, and the like. The hardening agent is merely added and mixed with the composition in order to effect hardening. If desired, heat may be applied to hasten the rate of hardening. The amounts of hardening agent vary considerably depending upon the composition and particular agent employed. The amino compounds are generally used in amounts of about an added 5% to 20%.

In applying the composition for adhesive purposes, the glycidyl ether of the polyhydric phenol has added thereto sufficient of the cyano-substituted hydrocarbon so that a spreadably fluid and homogeneous mixture is obtained. The hardening agent is then mixed with the composition and the mixture is applied as by spreading upon a surface desired to be united to another surface at a thickness of about 0.0005 to 0.1 inch thickness. The adhesive mixture is suitable for uniting various surfaces such as wood to wood, wood to metal, metal to metal, resin to resin, or any combination thereof. After application and joinder of the surfaces desired to be united, the adhered articles are allowed to cure for a period of from about 30 minutes to a day or more, depending upon the hardening agent employed. In this time, the adhesive composition will set up to a solid which will permit ordinary handling thereof. Maximum strength of the adhesive layer will be reached within one or two weeks. While the application is effected at ordinary atmospheric temperature and the curing may also be permitted to occur at such temperatures, the curing may be effected in shorter times at elevated temperatures such as up to 75° C., 100° C., 150° C., or even higher in some cases. In cases where an elevated curing temperature is employed, the chosen temperature is preferably below the boiling temperature of the lowest boiling component contained in the composition, and most preferably, it is at least 20° C. below such boiling temperature.

The excellent adhesive strength characteristics obtained with the compositions of the invention upon curing even at room temperature are evident from the data collected in Table III. A composition was prepared containing 85% of the glycidyl ether of bis-phenol prepared as described in Example I (resin A) and 15% of acetonitrile. The composition was spreadably fluid in having a viscosity of about 0 on the Gardner-Holdt scale. An added 10% of the named amine was mixed into the composition and the mixture was applied and tested as described below.

The adhesive properties were tested with blocks of about one-quarter inch thickness consisting of linen cloth laminated with phenol-formaldehyde resin. The freshly prepared adhesive mixtures were spread on a one inch square surface of each of two phenolic blocks with the aid of a doctor blade having a clearance of 0.005 inch. The coated surfaces of the blocks were then united and the joined blocks were placed in a constant temperature room set at 77° F. Glued blocks were removed from the constant temperature room after the noted times and subjected to the block shear test of the Army-Navy-Civil Committee on Aircraft Design Criteria: "Wood Aircraft Inspection and Fabrication," ANC-19 (Dec. 20, 1943), discussed in an article by R. C. Rinker and G. M. Kline, Modern Plastics, vol. 23, p. 164, 1945. In order to determine the resistance to contact with water, one pair of blocks was immersed in water at 77° F. for an additional 24 hours before being subjected to the shear test. The values given in the table are the shear strengths in pounds per square inch for the compositions.

*Table III*

| Hardening Agent | Shear Strength (p. s. i.) After | | |
|---|---|---|---|
| | 4 days | 8 days | 7 days plus 24 hrs. under water |
| Triethylamine | 2,535 | 2,460 | 2,400 |
| Diacetone diamine | 1,135 | 2,875 | 3,030 |

The compositions of the invention give cured resins which also have excellent resistance to solvents as is exemplified by the results given in Table IV. Compositions were prepared containing resin A and the noted percentages by weight of acetonitrile or methanol. An added 15% of pyridine was then introduced as hardening agent. Cast sheets were then prepared by allowing curing to occur at 25° C. for 24 hours and then at 65° C. for 48 hours. The resulting sheets were immersed in acetone for 12 days at 25° C. and the percentage change in weight determined. The sheets containing the acetonitrile underwent no appreciable change. On the other hand, the sheets containing the methanol not only absorbed a large proportion of acetone, but they also were badly disintegrated.

*Table IV*

| Percentage Diluent | | Percentage Change In Weight |
|---|---|---|
| Acetonitrile | Methanol | |
| 10 | | −0.6 |
| | 10 | +23.0 |
| 15 | | −0.6 |
| | 15 | +23.0 |
| 20 | | −1.1 |
| | 20 | +10.0 |
| 30 | | −0.4 |
| | 30 | not cured |

In some cases it is desirable to include an additional component in the compositions containing the glycidyl ether of a polyhydric phenol and the nitrile. This extra component may be a glycidyl ether of a polyhydric alcohol containing a plurality of glycidyl groups. These include such polyglycidyl ethers as diglycidyl ethers of ethylene glycol, propylene glycol, trimethylene glycol, butylene glycol, diethylene glycol, triethylene glycol, glycerol, tripropylene glycol, and the like, as well as ethers containing more than two glycidyl groups, such as the polyglycidyl ethers of glycerol, diglycerol, erythritol, pentaglycerol, pentaerythritol, mannitol, sorbitol, polyallyl alcohol, polyvinyl alcohol, and the like. Such glycidyl ethers also have a 1,2-epoxy value greater than 1.0. The highly viscous glycidyl polyethers of polyhydric alcohols (those having a viscosity greater than 100 poises at 25° C.) can also be fluidized by addition of the cyano-substituted hydrocarbon in order to obtain two component compositions similarly useful and curable.

The polyglycidyl polyethers of the polyhydric alcohols are prepared by reacting the polyhydric alcohol with epichlorhydrin in the presence of 0.1% to 2% of an acid-acting compound as catalyst such as boron trifluoride, hydrofluoric acid or stannic chloride whereby the chlorhydrin ether is formed as product. The reaction is effected at about 50° C. to 125° C. with the proportions of reactants being such that there is about one mole of epichlorhydrin for each molecular equivalent of hydroxyl group in the polyhydric alcohol. Thus, in preparing the ether of diethylene glycol, which glycol contains two hydroxyl groups in each molecule thereof, about two moles of epichlorhydrin for each mole of diethylene glycol are used. The resulting chlorhydrin ether from the reaction of a polyhydric alcohol with epichlorhydrin is dehydrochlorinated by heating at about 50° C. to 125° C. with a small, say 10%, stoichiometrical excess of a base. For this purpose, sodium aluminate gives good results.

Preparation of the polyglycidyl ethers of polyhydric alcohols may be illustrated by considering application of the above method to preparation of the polyglycidyl ether of glycerol.

EXAMPLE II

In parts by weight, about 276 parts of glycerol (3 moles) were mixed with 828 parts of epichlorhydrin (9 moles). To this reaction mixture were added 10 parts of a diethyl ether solution containing about 4.5 of boron trifluoride. The temperature rose as a result of the exothermic reaction and external cooling with ice water was applied so as to keep the temperature between about 50° C. and 75° C. during a reaction period of about 3 hours. About 370 parts of the resulting glycerolepichlorohydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 205° C. at 20 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in a dioxane solution. These values showed that the polyglycidyl ether had a 1,2-epoxy equivalency of 2.18—i. e., an average of about 2.2 epoxide groups per molecule. For convenience, this product will be known as resin B.

Various proportions of the polyglycidyl ether of a polyhydric alcohol are used in admixture with the glycidyl ether of a polyhydric phenol such as an added 0% to 200%. Sufficient cyano compound is also admixed therewith to adjust the viscosity to the desired value. In general, the three-component compositions contain about 50% to 80% of the glycidyl ether of a polyhydric phenol, about 10% to 40% of the polyglycidyl ether of a polyhydric alcohol and about 1% to 30% of the nitrile diluent, the total of the percentage, of course, being 100. The proportions vary from these, depending upon the fluidity of particular components, since having the whole composition or mixture at a spreadable consistency is the important feature of the invention, and not particular numerical limits for the constituents in the composition.

The use of the three component compositions is illustrated by a composition prepared and containing 68.2% by weight of resin A, 22.7% of resin B and 9.1% acetonitrile. The composition, which had a viscosity of about 3 poises at 25° C., was tested for adhesive purposes using an added 12.5% of triethylamine or an added 8% diethylene triamine as hardening agent. The adhesive tests were conducted as described above using phenolic linen blocks and 6 days' cure time at 77° F. It was found that the shear strengths were the very high values of 4320 pounds per square inch when triethylamine was employed and 4745 pounds per square inch with diethylene triamine.

The use of various cyano-substituted hydrocarbons is illustrated in Table V. Compositions were prepared containing 62.5% by weight of resin A, 20.8 of resin B and 16.7% of the named nitrile. The compositions had a viscosity of about F on the Gardner-Holdt scale. Cure of the compositions were effected by introducing an added 12.5% of triethylamine or an added 8% to diethylene triamine. The resulting mixtures were tested as adhesives with phenolic linen blocks as described hereinbefore after curing for 6 days at 77° F. Shear strengths in pounds per square inch (p. s. i.) were obtained as given in the table.

*Table V*

| Diluent | Shear Strengths (p. s. i.) Using— | |
|---|---|---|
| | Triethyl Amine | Diethylene Triamine |
| Propionitrile | 1,490 | 2,130 |
| Acrylonitrile | 1,315 | 870 |
| Methacrylonitrile | 3,335 | 1,830 |
| cis-Crotonitrile | 2,560 | 1,960 |
| trans-Crotonitrile | 2,040 | 920 |
| Benzonitrile | 1,490 | 1,880 |
| Adiponitrile | 2,030 | 1,350 |

In using the compositions of the invention, various other substances besides the essential ingredients may be incorporated therein such as dyes, pigments and/or fillers. The use of certain fillers like powdered zinc oxide, silica, alumina, clay or bauxite, are particularly advantageous for obtaining cured adhesive bonds which retain high strength even when heated and when used to bond metals like aluminum. These facts will be evident from the results given in Table VI. A composition was prepared containing by weight 75 parts of resin A, 25 parts of resin B and 6 parts of acetonitrile. This composition had a viscosity of about Z-2 on the Gardner-Holdt scale. There were then added 100 parts of powdered bauxite consisting of alumina containing about 17.5% iron oxide. As curing agent, 12.5 parts of triethyl amine were admixed. The adhesive was tested with phenolic linen blocks as well as with similar aluminum blocks according to the procedure described previously. A curing time of 6 days at 77° F. was employed. Shear strengths were ascertained at 25° C. as well as at the elevated temperatures noted in the table. In order to determine the resistance of the bonds to the action of hot water, blocks were also immersed in boiling water for one hour and the shear strength thereon obtained after cooling to room temperature.

*Table VI*

| Temperature or Treatment | Shear Strengths (p. s. i.) With— | |
|---|---|---|
| | Phenolic Linen Blocks | Aluminum Blocks |
| 25° C | 4,915 | 2,045 |
| 75° C | 2,275 | 2,335 |
| 90° C | 1,795 | 3,530 |
| 105° C | 1,470 | 4,830 |
| Boiled 1 hour in water | 3,475 | 3,920 |

This application is a continuation-in-part of our copending application Serial No. 149,214, filed March 11, 1950.

We claim as our invention:

1. A fluid composition of matter adapted to resinify upon admixture therewith of a hardening agent comprising glycidyl polyether having a viscosity of at least 100 poises at 25° C. and a 1,2-epoxy equivalency greater than 1.0 in admixture with a fluidizing proportion of a cyano-substituted hydrocarbon having a melting point below 10° C. such that the composition has a viscosity of about 1 to 80 poises at 25° C.

2. A fluid composition of matter adapted to resinify upon admixture therewith of a hardening agent comprising glycidyl polyether of a dihydric phenol having a viscosity of at least 100 poises at 25° C. and a 1,2-epoxy equivalency between 1.0 and 2.0 in admixture with a cyano-substituted hydrocarbon having a melting point below 10° C., the hydrocarbon containing nitrile as sole substituent and the cyano-substituted hydrocarbon being present in such proportion that the mixture has a viscosity of about 1 to 80 poises at 25° C.

3. A fluid composition of matter adapted to resinify upon admixture therewith of a hardening agent comprising glycidyl polyether of a dihydric phenol having a viscosity of at least 100 poises at 25° C. and a 1,2-epoxy equivalency between 1.0 and 2.0 in admixture with such a proportion of a saturated hydrocarbon containing 1 to 2 nitrile groups as sole substituents that the mixture has a viscosity of 3 to 70 poises at 25° C., said nitrile containing 2 to 8 carbon atoms and having a melting point below 10° C.

4. A fluid composition of matter adapted to resinify upon admixture therewith of a hardening agent comprising glycidyl polyether of 2,2-bis(4-hydroxyphenyl)propane having a viscosity of at least 100 poises at 25° C. and a 1,2-epoxy equivalency between 1.0 and 2.0 in admixture with a fluidizing proportion of a cyano-substituted hydrocarbon having a melting point below 10° C., the hydrocarbon containing nitrile as sole substituent.

5. A fluid composition of matter adapted to resinify upon admixture therewith of a hardening agent comprising glycidyl polyether of 2,2-bis(4-hydroxyphenyl)propane having a viscosity of at least 100 poises at 25° C. and a 1,2-epoxy equivalency between 1.0 and 2.0 in admixture with such a proportion of a saturated hydrocarbon containing 1 to 2 nitrile groups as sole substituents that the mixture has a viscosity of 3 to 70 poises at 25° C., said nitrile containing 2 to 8 carbon atoms and having a melting point below 10° C.

6. A fluid composition of matter adapted to resinify upon admixture therewith of a hardening agent comprising glycidyl polyether having a viscosity of at least 100 poises at 25° C. and a 1,2-epoxy equivalency greater than 1.0 in admixture with a fluidizing proportion of acetonitrile such that the composition has a viscosity of about 1 to 80 poises at 25° C.

7. A fluid composition of matter adapted to resinify upon admixture therewith of a hardening agent comprising glycidyl polyether of 2,2-bis(4-hydroxyphenyl)propane having a viscosity of at least 100 poises at 25° C. and a 1,2-epoxy equivalency between 1.0 and 2.0 in admixture with such a proportion of acetonitrile that the mixture has a viscosity of about 1 to 80 poises at 25° C.

8. A fluid composition of matter adapted to resinify upon admixture therewith of a hardening agent comprising 50% to 80% glycidyl polyether of a dihydric phenol having a viscosity of at least 100 poises at 25° C. and a 1,2-epoxy equivalency between 1.0 and 2.0, 10% to 40% of glycidyl polyether of an aliphatic polyhydric alcohol containing a plurality of glycidyl groups, and 1% to 30% of acetonitrile, the sum of the percentages being 100 and the viscosity of said mixture being not greater than 80 poises at 25° C.

9. A fluid composition of matter adapted to resinify upon admixture therewith of a hardening agent comprising glycidyl polyether of 2,2-bis(4-hydroxyphenyl)propane having a viscosity of at least 100 poises at 25° C. and a 1,2-epoxy equivalency between 1.0 and 2.0 in admixture with such a proportion of propionitrile that the mixture has a viscosity of about 1 to 80 poises at 25° C.

10. A fluid composition of matter adapted to resinify upon admixture therewith of a hardening agent comprising glycidyl polyether of 2,2-bis(4-hydroxyphenyl)propane having a viscosity of at least 100 poises at 25° C. and a 1,2-epoxy equivalency between 1.0 and 2.0 in admixture with such a proportion of adiponitrile that the mixture has a viscosity of about 1 to 80 poises at 25° C.

11. A fluid composition of matter adapted to resinify upon admixture therewith of a hardening agent comprising glycidyl polyether of 2,2-bis(4-hydroxyphenyl)propane having a viscosity of at least 100 poises at 25° C. and a 1,2-epoxy equivalency between 1.0 and 2.0 in admixture with such a proportion of acrylonitrile that the mixture has a viscosity of about 1 to 80 poises at 25° C.

12. A fluid composition of matter adapted to resinify upon admixture therewith of a hardening agent comprising glycidyl polyether of 2,2-bis(4-hydroxyphenyl)propane having a viscosity of at least 100 poises at 25° C. and a 1,2-epoxy equivalency between 1.0 and 2.0 in admixture with such a proportion of benzonitrile that the mixture has a viscosity of about 1 to 80 poises at 25° C.

EDWARD CHARLES SHOKAL.
ALBERT C. MUELLER.

No references cited.